(12) United States Patent
Fujino et al.

(10) Patent No.: US 12,112,181 B1
(45) Date of Patent: Oct. 8, 2024

(54) INFORMATION PROCESSING SYSTEM

(71) Applicants: FAIRY DEVICES Inc., Tokyo (JP); DAIKIN INDUSTRIES, LTD., Osaka (JP)

(72) Inventors: Masato Fujino, Tokyo (JP); Jun Kuchii, Tokyo (JP); Yuichiro Takezaki, Tokyo (JP)

(73) Assignees: FAIRY DEVICES INC., Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/701,403

(22) PCT Filed: Oct. 18, 2022

(86) PCT No.: PCT/JP2022/038781
§ 371 (c)(1),
(2) Date: Apr. 15, 2024

(87) PCT Pub. No.: WO2023/068275
PCT Pub. Date: Apr. 27, 2023

(30) Foreign Application Priority Data

Oct. 18, 2021 (JP) .................................. 2021-170249

(51) Int. Cl.
*G06F 9/448* (2018.01)
*H04L 9/40* (2022.01)
(52) U.S. Cl.
CPC ............ *G06F 9/4494* (2018.02); *H04L 63/08* (2013.01)
(58) Field of Classification Search
CPC ................................ G06F 9/4494; H04L 63/08
See application file for complete search history.

(56) References Cited

U.S. PATENT DOCUMENTS

2002/0144020 A1* 10/2002 Gooding ................. G06F 9/547
719/330
2016/0077901 A1* 3/2016 Roth ....................... G06F 8/315
719/328

(Continued)

FOREIGN PATENT DOCUMENTS

EP      2733608 A2 *  5/2014  ............ G04G 21/00
JP      2017-63416 A    3/2017

(Continued)

OTHER PUBLICATIONS

International Search Report issued in family member WIPO Patent Application No. PCT/JP2022/038781, dated Nov. 29, 2022, along with an English translation thereof.

(Continued)

*Primary Examiner* — James R Turchen
(74) *Attorney, Agent, or Firm* — GREENBLUM & BERNSTEIN, P.L.C.

(57) ABSTRACT

An information processing system includes a plurality of terminal devices, a client device, and a cloud including one or a plurality of server devices. The client device or the cloud includes: a processing instruction unit for designating a specific terminal device from among the plurality of terminal devices and instructing the specific terminal device to perform processing in accordance with a prescribed program; an authentication information storage unit for retaining authentication information necessary for carrying out the prescribed program; and an authentication information providing unit for providing, to the specific terminal device designated by the processing instruction unit, authentication information or, as a substitute therefor, temporary information, necessary for executing the processing in accordance with the program instructed by the processing instruction unit. The specific terminal device uses the (Continued)

authentication information or the temporary information to execute the processing based on the instruction from the processing instruction unit.

8 Claims, 7 Drawing Sheets

(56) References Cited

U.S. PATENT DOCUMENTS

| | | |
|---|---|---|
| 2016/0134956 A1 | 5/2016 | Tan et al. |
| 2017/0085600 A1 | 3/2017 | Carter et al. |
| 2017/0192803 A1* | 7/2017 | Martori ............... G06F 9/466 |
| 2019/0025801 A1 | 1/2019 | Suzuki et al. |
| 2021/0275034 A1* | 9/2021 | Frank ................ G01J 5/0265 |
| 2022/0326974 A1* | 10/2022 | Bond ................... G06F 9/54 |
| 2023/0073190 A1* | 3/2023 | Kim ................. G06F 16/951 |
| 2023/0362292 A1* | 11/2023 | Liu ................. H04L 12/2825 |

FOREIGN PATENT DOCUMENTS

| | | |
|---|---|---|
| JP | 2017-170537 A | 9/2017 |
| JP | 2019-36155 A | 3/2019 |
| JP | 2020-091592 A | 6/2020 |
| JP | 2020-150400 A | 9/2020 |
| JP | 2021-082802 A | 5/2021 |
| WO | 2017/038100 A1 | 3/2017 |
| WO | 2021/100331 A1 | 5/2021 |
| WO | 2021/125499 A1 | 6/2021 |

OTHER PUBLICATIONS

Decision to Grant a Patent issued in family member Japanese Patent Application No. 2023-505807, dated Sep. 4, 2023, along with an English translation thereof.
Notice of Reasons of Refusal issued in family member Japanese Patent Application No. 2023-505807, dated Apr. 5, 2023, along with an English translation thereof.
"Getting Really Good with Mongoose OS (2/2): calling the RPC endpoints of ESP 32," dated Oct. 12, 2019, together with an English translation thereof.

* cited by examiner

[Figure 1]
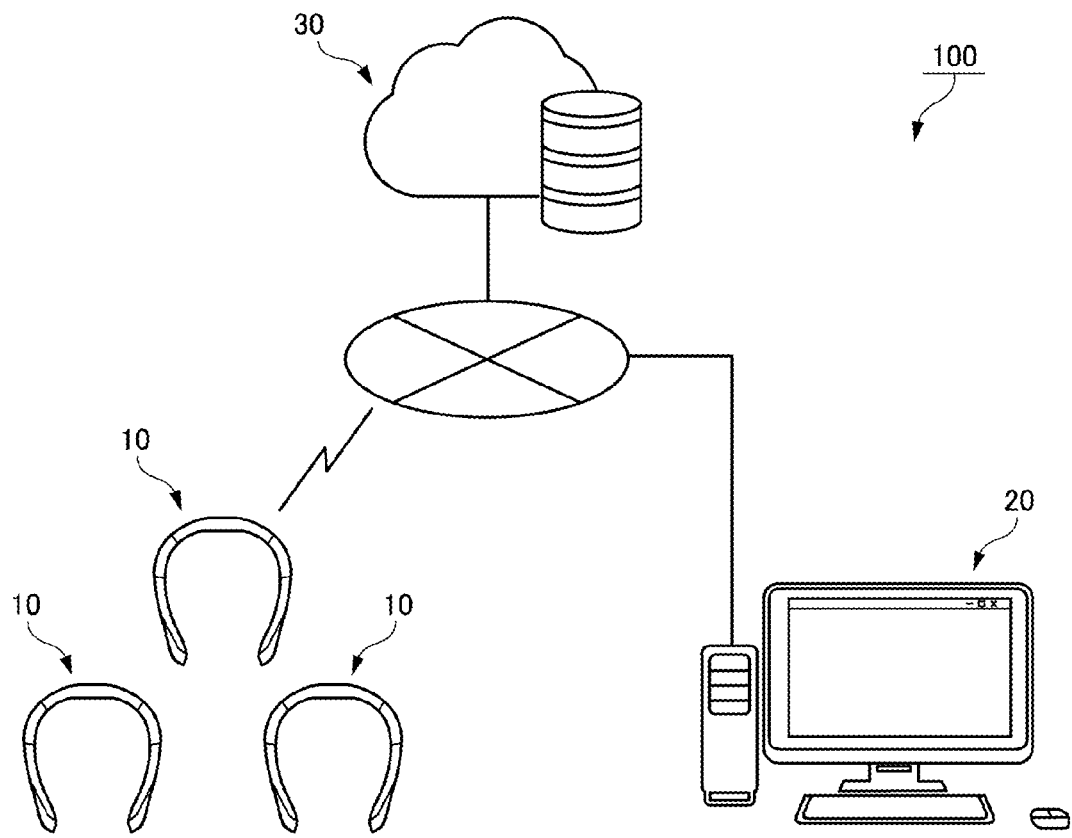

[Figure 2]
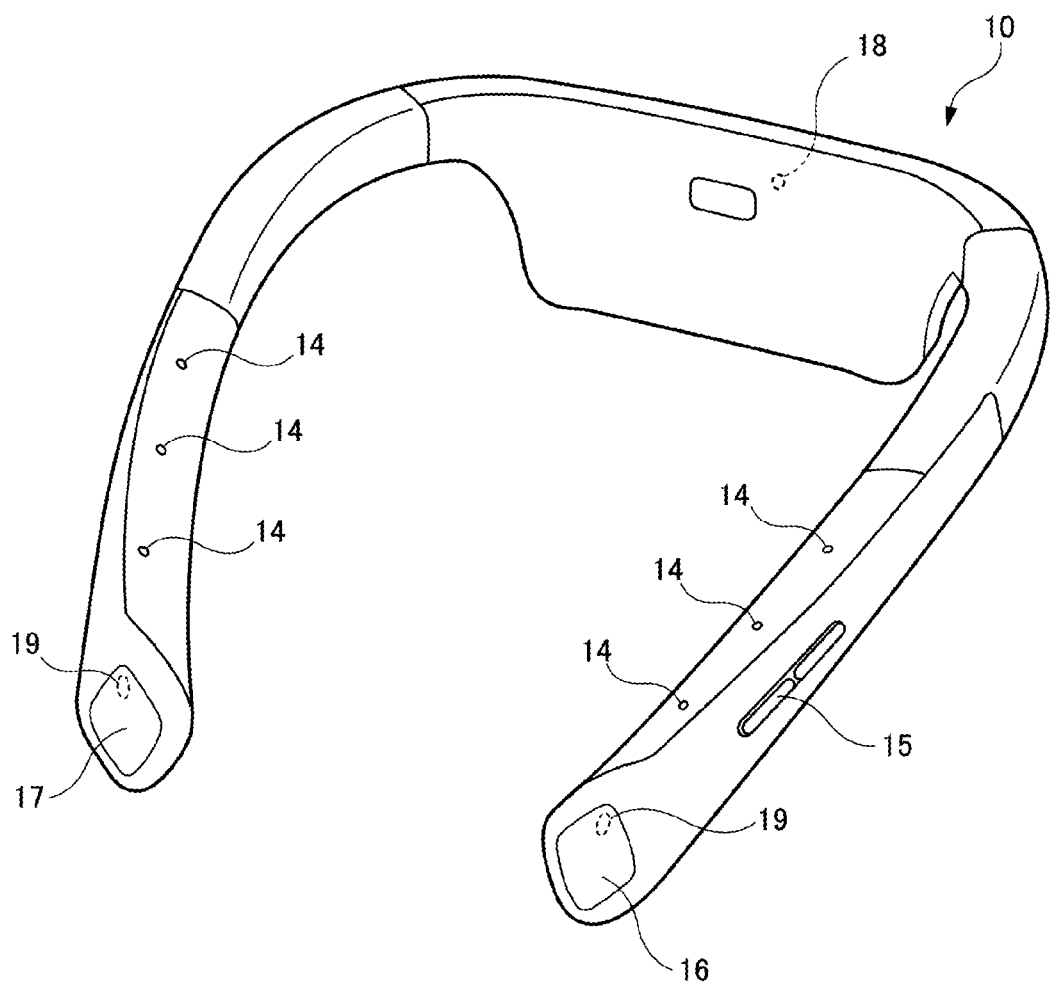

[Figure 3]
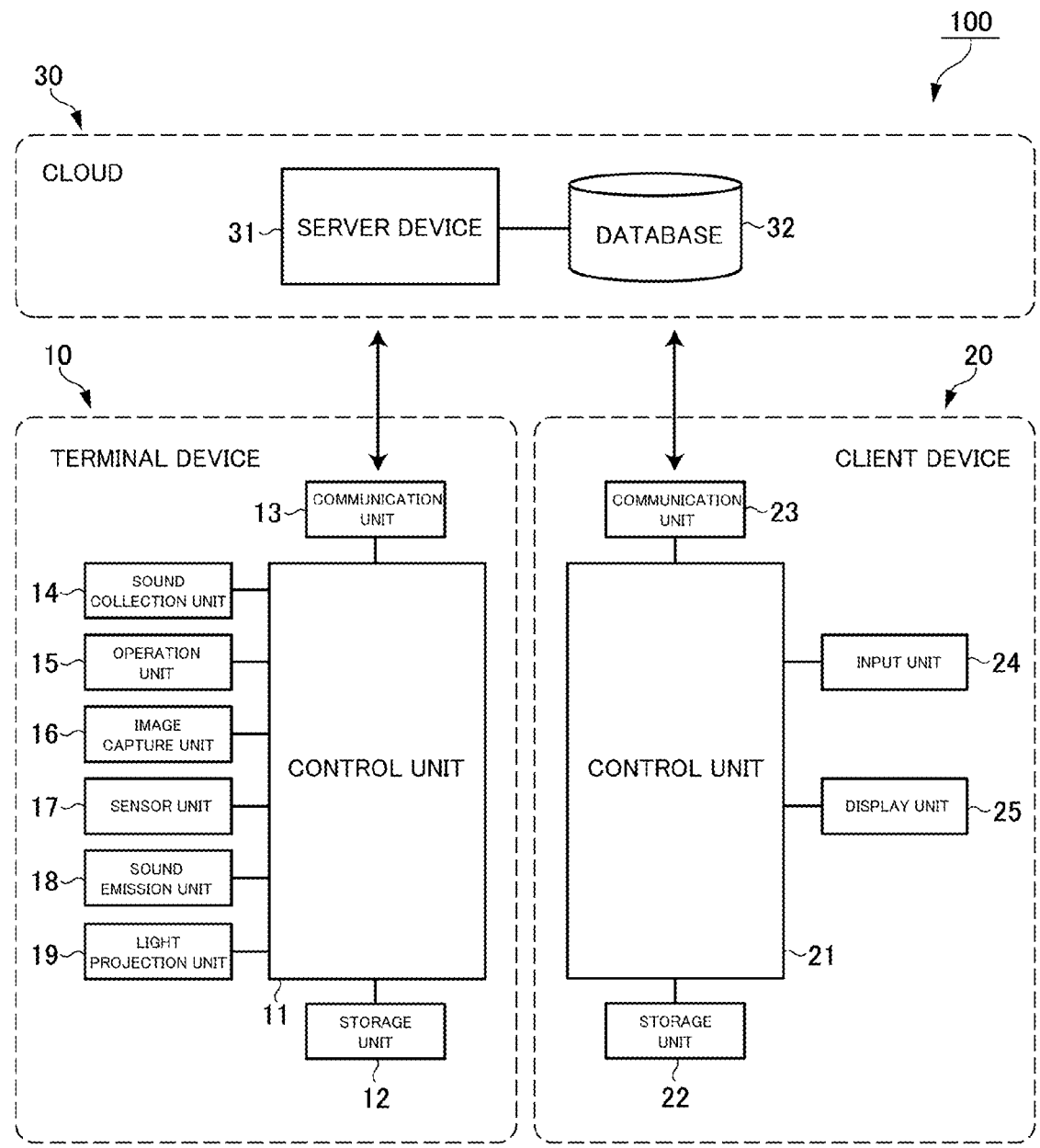

[Figure 4]
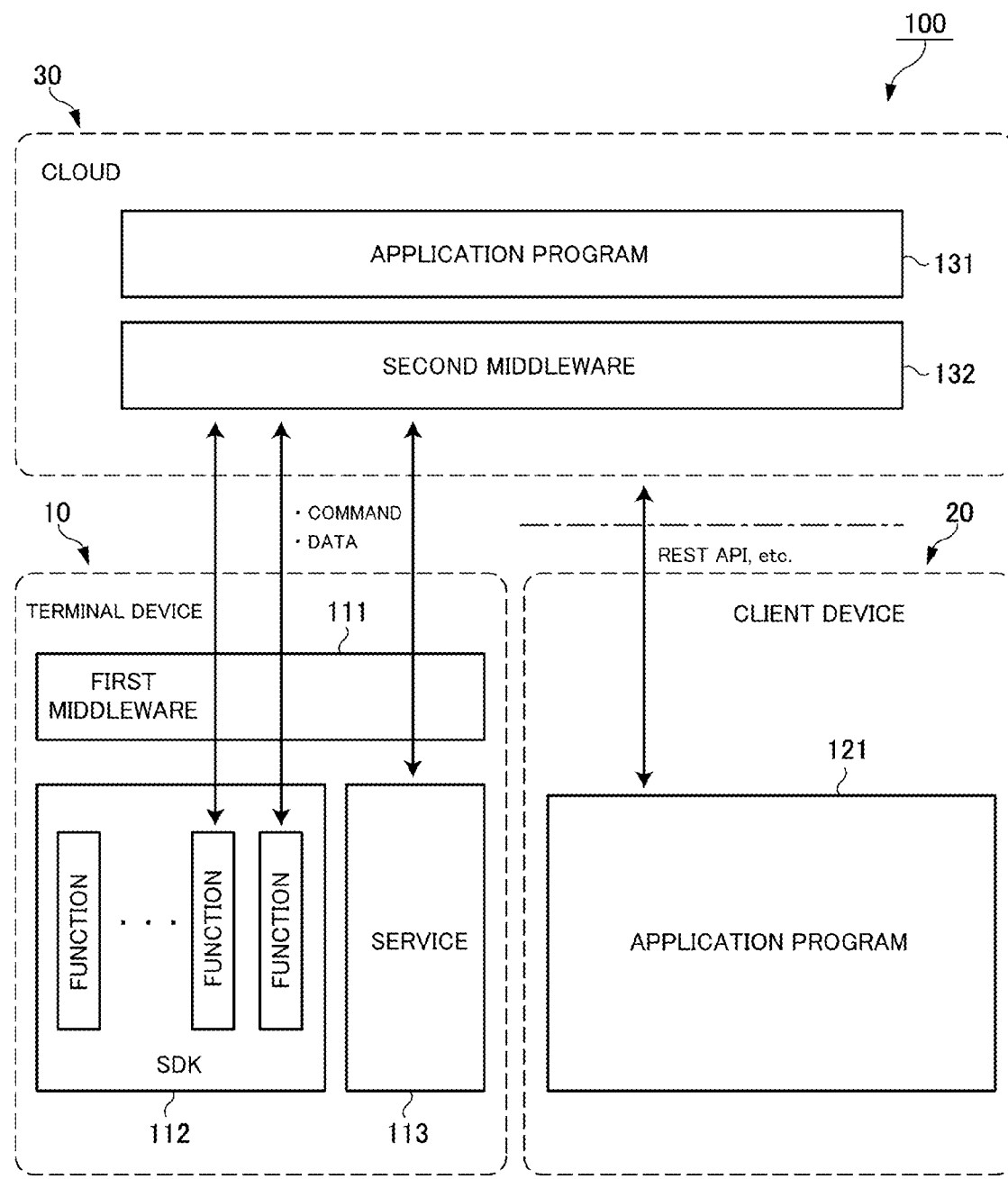

[Figure 5]
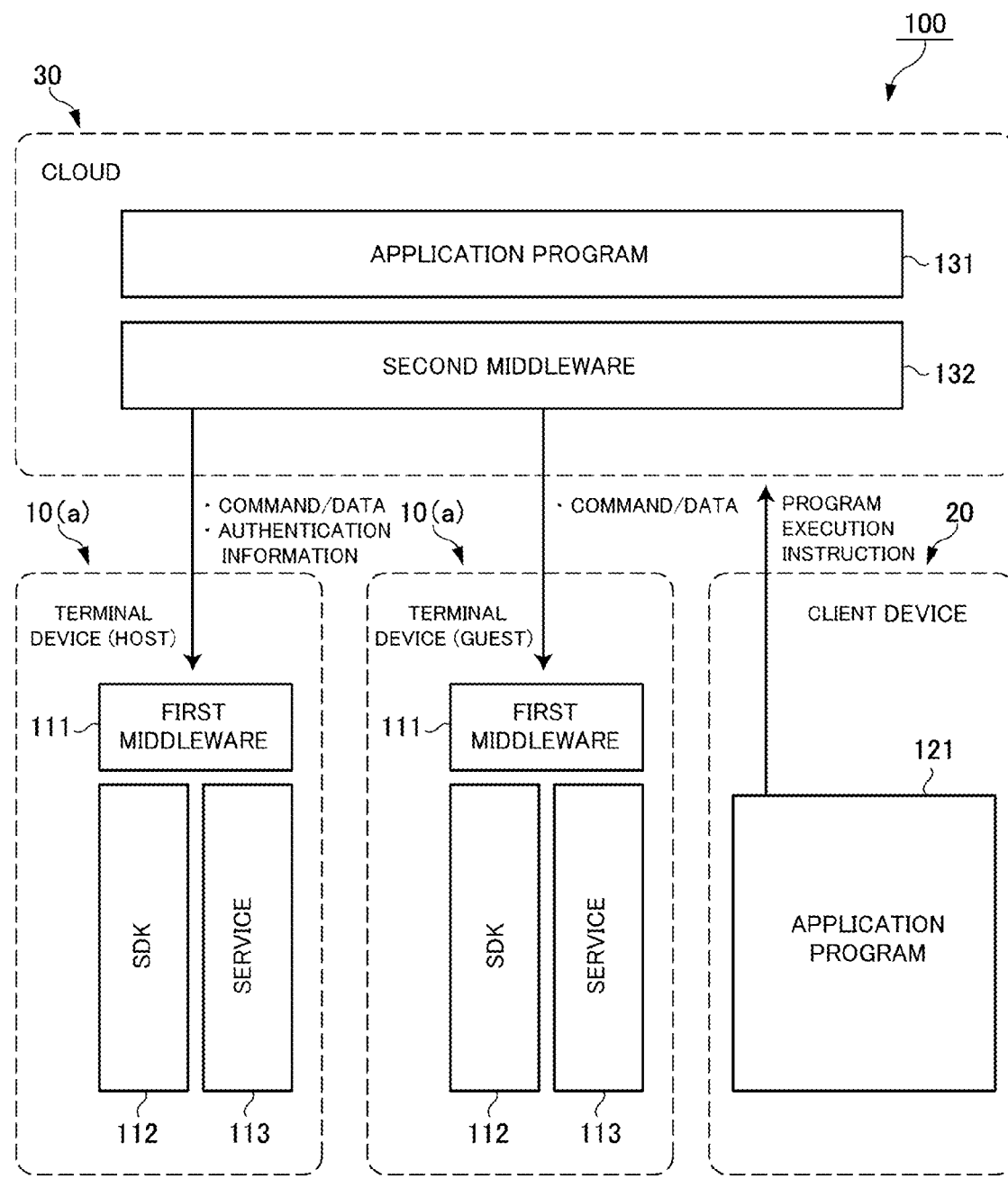

[Figure 6]
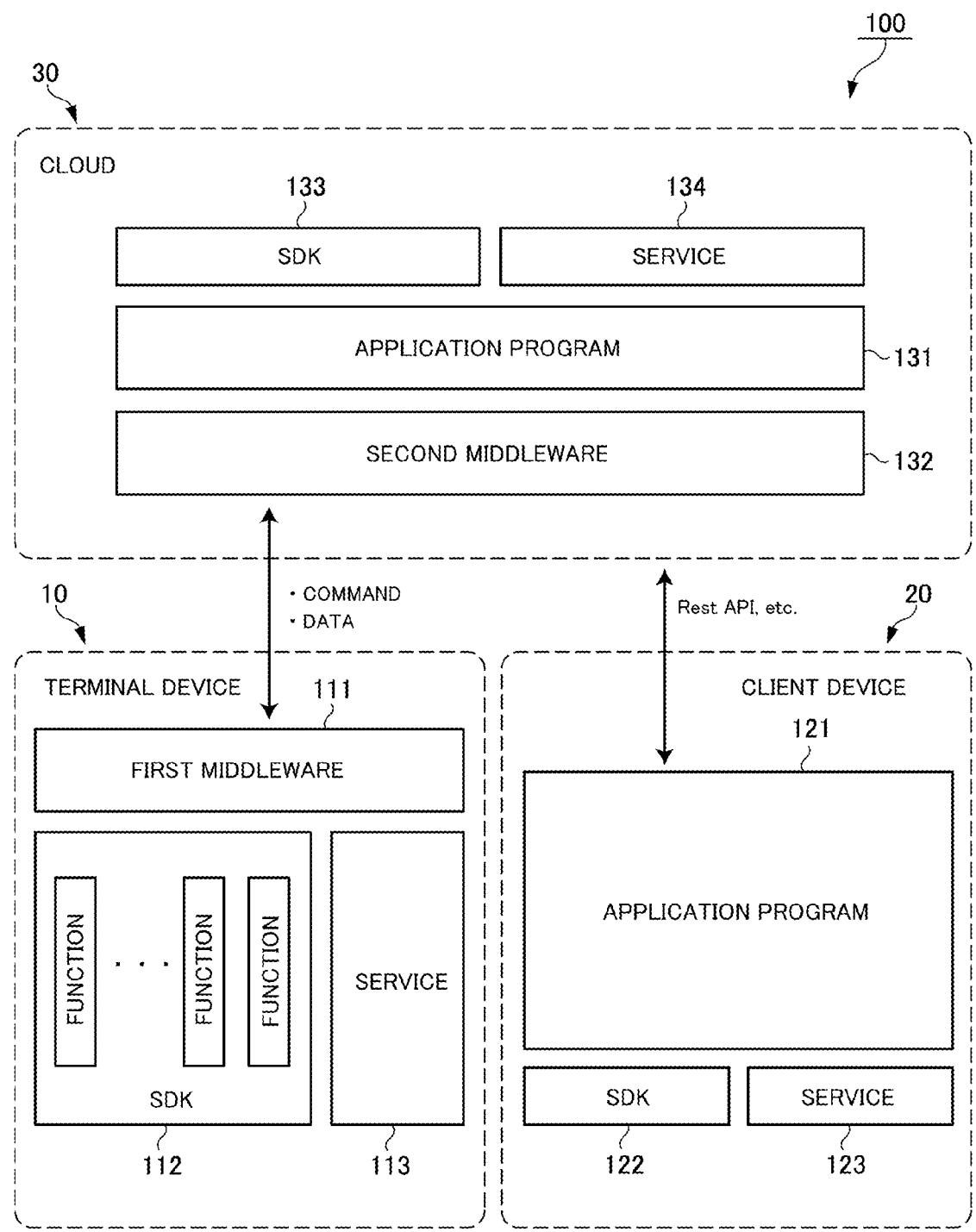

[Figure 7]
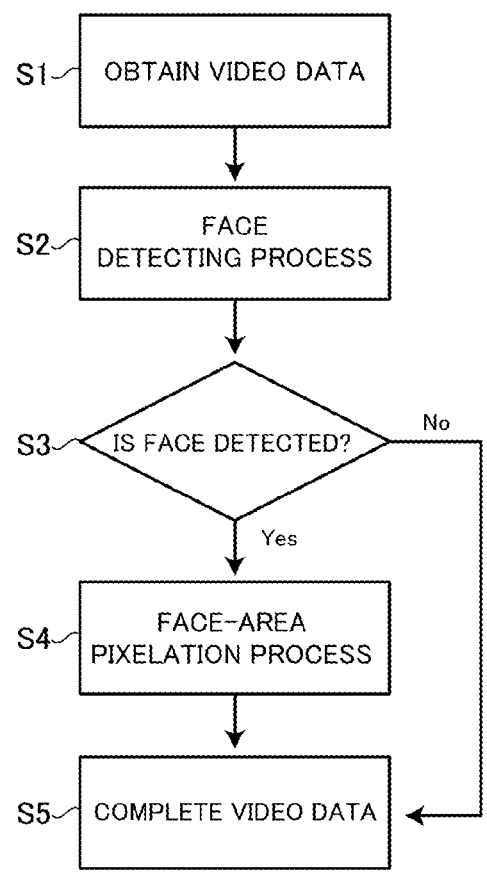
$$MOVIE\_DATA_i = CREATE\_MOSAIC_j\ (DETECT\_FACE_j\ (GET\_MOVIE_i))$$

INFORMATION PROCESSING SYSTEM

TECHNICAL FIELD

The present invention relates to an information processing system. More specifically, an information processing system according to the present invention relates to remote control of terminal devices and is to be used for remote support of workers on-site and the like.

BACKGROUND ART

Conventionally, a remote work support system that includes a wearable device worn by a worker and a management device connected to this device through the Internet has been known (e.g., Patent Literature 1). The management device is operated by a supporter who remotely monitors work by the worker on site and gives an instruction on the work. The wearable device is equipped with a camera, a pointing device, and a microphone, and by controlling this wearable device via the management device, the supporter can check a captured image by the camera and send an instruction to the worker with the pointing device.

The applicants have proposed a small-sized, multifunctional neck-worn wearable device (e.g., Patent Literature 2). This neck-worn device includes input-output equipment such as a camera, a speaker, a microphone, and a gesture sensor and can record and analyze a conversation between persons talking to each other and analyze a captured image by the camera. Patent Literature 2 also proposes voice calling between persons wearing neck-worn devices, and by using these neck-worn devices, a teleconference can be held among workers on site.

CITATION LIST

Patent Literature

Patent Literature 1: JP 2020-150400 A
Patent Literature 2: JP 2021-082802 A

SUMMARY OF INVENTION

Technical Problem

As with conventional remote work support systems, a system in which a management device controls, via the Internet, a terminal device such as a wearable device assumes that, for each function to be executed by the terminal device, an application program dedicated to the function is installed in advance separately on the terminal device. For example, in order to execute functions of camera controlling, voice analyzing, image analyzing, and web conferencing, separate programs for the functions are needed, and if these programs are not included in the terminal device, the management device remotely controlling the terminal device fails to cause the terminal device to actually execute the functions. Therefore, a problem arises in that programs need to be developed separately for the functions of the terminal device, increasing development costs. In addition, it can be assumed that different programs or different sets of programs are installed on different terminal devices. In this case, it is necessary to separately control the terminal devices to cause the terminal devices to execute the programs, and thus a problem arises in that it is difficult to collectively control and manage the plurality of terminal devices.

In contrast, in a case where separate application programs are not installed beforehand on terminal devices, there arises a problem of how to treat authentication information for executing the programs. For example, in a case where a specific program and authentication information are sent to a terminal device when the program needs to be executed in the terminal device, security of an authentication process cannot be maintained. It is also conceivable that only a specific program is delivered to a terminal device, and that a user wearing the terminal device inputs authentication information (an account name and a password) into the terminal device, but such an operation is complicated and involves a risk such as forgetting the password.

In a server-client system typified by IoT and the like, it is necessary to consider which of a server device and a terminal device performs a process for implementing some service. As a specific example, in a remote support service or a working video recording service using a terminal device, personal information such as a face of a person or a license plate of an automobile is seen in some cases in a video captured by the terminal device, and thus, a pixelation process is performed on a predetermined area in the video because of a privacy problem. At this time, for example, there arises a problem of which of the terminal device and the server device performs the pixelation process. For example, it is necessary to ensure that more highly confidential personal information is subjected to the pixelation process by the terminal device so that the personal information is not saved in the server device. In contrast, it is efficient to subject pieces of less confidential information collectively to the pixelation process in the server device with a higher processing performance. As seen above, it is desirable that a place to perform a process can be changed as appropriate in accordance with a situation of using the terminal device or a location of work, and for this purpose, it is usually necessary to prepare in advance a dedicated application program in accordance with a place to perform the process. In this case, it is conceivable to change a type of a program to be installed on a terminal device in accordance with a use, such as installing, on some terminal device, a program for performing the pixelation process on a captured image in the device and installing, on another terminal device, a program for uploading a captured image to the server device so as to cause the server device to perform the pixelation process on the captured image. However, when different programs or different sets of programs are installed on different terminal devices, a problem arises in that it is difficult to collectively control and manage the plurality of terminal devices, as mentioned above.

The present invention is studied in view of the problems of the conventional techniques described above and has an object to solve at least one of the problems. More specifically, the present invention has an object to provide an information processing system suitable for collectively managing a plurality of terminal devices.

Solution to Problem

The present invention relates to an information processing system. An information processing system according to the present invention includes a plurality of terminal devices, a client device, and a cloud. The cloud includes one or a plurality of server devicees connected to the plurality of terminal devices and the client device through a network. In the present invention, the terminal devices are, for example, wearable devices. In particular, the terminal devices are preferably neck-worn wearable devices. Note that the terminal devices are not limited to wearable devices and may be, for example, edge devices each including various types of input-output equipment such as a camera, a microphone, other sensors (a temperature sensor, an optical sensor, etc.), a monitor, a projector, a speaker, and an actuator (a motor, etc.). The edge devices are, for example, surveillance cameras.

In the information processing system according to the present invention, the client device and/or the cloud includes a process instruction unit, an authentication information storage unit, and an authentication information providing unit. The process instruction unit specifies a specific terminal device from among the plurality of terminal devices and instructs the specific terminal device to execute a process according to a predetermined program. The authentication information storage unit retains authentication information necessary to execute the predetermined program. The authentication information providing unit provides the specific terminal device specified by the process instruction unit with authentication information that is necessary to perform a process according to a program for which the process instruction unit has given an instruction or with temporary information (a token for granting a privilege) that is an alternative to the authentication information. The authentication information or the like in this case is, for example, authentication information for accessing a server device of an external business operator that provides a web conference service and for logging in to the server device. Alternatively, the authentication information providing unit provides the specific terminal device specified by the process instruction unit with authentication information for checking whether the process according to the program for which the process instruction unit has given an instruction has been permitted to be performed or with temporary information (a token for granting a privilege) that is an alternative to the authentication information. The authentication information in this case is, for example, authentication information for, in a case where a device that can perform a specific process according to the program (e.g., a pixelation process on a captured image) is limited beforehand, checking whether a terminal device has been permitted to perform the process. The plurality of terminal devices each uses the authentication information or the temporary information provided from the authentication information providing unit to perform a process based on an instruction from the process instruction unit. For example, the terminal devices each access an external server device that provides a web conference service and use the authentication information or the like provided from the authentication information providing unit to execute a process concerning a web conference. For example, in a case where a device that can perform a pixelation process on a captured image is limited beforehand, each terminal device uses the authentication information or the like provided from the authentication information providing unit to check whether the terminal has been given a permission to perform this process, and when the permission is confirmed, the terminal device executes this process. Note that, in the present invention, the terminal devices need not execute a program by themselves, and the terminal devices each only have to perform a process according to a program executed by the client device or the cloud (i.e., "a process based on an instruction from the process instruction unit"). In this case, the program need not be installed in advance on the terminal devices, and the terminal devices each only have to include functions to be called according to commands in the program executed by the client device or the cloud.

As in the configuration described above, the client device or the cloud specifies a process to be executed by each terminal device and provides the terminal device with the authentication information necessary for the process or the temporary information that is an alternative to the authentication information, so that it is possible to cause each terminal device to execute a predetermined process (function) without making the terminal device itself include an application program and the authentication information. This makes it easy to collectively manage and remotely control the plurality of terminal devices.

In the information processing system according to the present invention, the client device or the cloud preferably further includes a program execution unit that executes a program for which the process instruction has given an instruction. In this case, the process instruction unit of the client device or the cloud instructs the specific terminal device to execute a process according to the program executed by the program execution unit. Then, the specific terminal device will perform a process based on an instruction from the process instruction unit, in other words, a process according to the program executed by the program execution unit. That is, the program for which the process instruction unit has given an instruction is not executed by each terminal device but is executed by the client device or the cloud. This program includes processing commands (function calling commands) for executing a plurality of functions in each terminal device. This enables the terminal device to perform any process without installing the program on the terminal device beforehand, as long as the terminal device retains a variety of functions provided as, for example, a known software development kit (SDK). As will be described later in detail, installing middleware in advance on the cloud and each terminal device is effective in causing the terminal device to perform a process in real time and at high speed in accordance with a program executed by the client device or the cloud.

The program executed by the client device or the cloud includes one or a plurality of processing commands (function calling commands). Therefore, the process instruction unit will instruct the specific terminal device to execute a process based on a processing command included in this program. In this case, the specific terminal device executes the process based on the processing command included in the program.

In the information processing system according to the present invention, the program may be an application program for a web conference. In addition, the authentication information may include authentication information for a host account and authentication information for a guest account of a web conference. In this case, the process instruction unit preferably specifies, from among the plurality of terminal devices, one terminal device to assign the host account of the web conference and another terminal device to assign the guest account for participating in the web conference hosted by the one terminal device. This enables a web conference to be held among the plurality of terminal devices. That is, conventionally, in a case where a plurality of workers wear wearable devices and hold a web conference using the wearable devices, a server device or a client device that manages the terminal devices normally serves as a host. In contrast, according to the present invention, the server device or the client device need not serve as a host, and the host account can be assigned to the specific terminal device, so that a web conference can be held among the terminal devices.

In the information processing system according to the present invention, the host account of the one terminal device and the guest account of the other terminal device are preferably interchangeable with each other. For example, when a battery of a terminal device hosting the web conference is running out, or in a case where loss of a network connection is known in advance (in a case where a radio field intensity has changed below a certain level), a host privilege can be moved to another terminal device. This makes it easy to continue the web conference among the terminal devices. The host account and the guest account can be automatically interchanged.

In the information processing system according to the present invention, the process instruction unit of the client device or the cloud may automatically specify the one terminal device to assign the host account, based on battery levels or communication qualities of the terminal devices. Naturally, the process instruction unit of the client device or the cloud can also automatically specify the one terminal device to assign the host account, based on both the battery levels and the communication qualities of the terminal devices. For example, the process instruction unit may be configured to specify a terminal with a highest battery level as the host account or specify a terminal with a highest speech quality as the host account, from among the plurality of terminal devices participating in the web conference. In a case where battery levels or speech qualities of the terminal devices vary during the web conference, the host account and the guest account can be automatically interchanged. Note that the "speech quality" is one or a plurality of quantified speech properties relating to a degree to which a conversation among users is clearly audible in a call made among the plurality of terminal devices. The speech properties here include, for example, electrical properties such as a received radio wave strength, a frequency response of a communication transmission system, and/or acoustic characteristics of noise and the like.

In the information processing system according to the present invention, the plurality of terminal devices preferably include a terminal device that includes no display unit such as a display. When the terminal device includes no display unit, it is difficult for a user of the terminal device to perform a complex operation such as an operation of the application program, but exactly for such a terminal device, it is particularly effective to use the system according to the present invention to remotely operate the terminal device with the client device.

In the information processing system according to the present invention, the program includes a plurality of processing commands (function calling commands). For each processing command included in the program, the process instruction unit selects a device that is to perform a process based on the processing command, from among the plurality of terminal devices, the plurality of server devices, and the client device. The terminal device, the server device, or the client device selected by the process instruction unit then executes a process (function) based on a processing command for which the process instruction unit has given an instruction. This enables a place to execute a process according to the program to be specified freely or automatically from among the plurality of terminal devices, the server devices, and the client device. Conventionally, it is common sense that a process according to a program is wholly executed in a device on which the program is installed, but according to the present invention, for each process, a place to execute the process can be freely selected to some extent irrespective of whether the program is installed on the place.

For example, the process instruction unit can be configured to cause the plurality of server devices or the client device to perform at least part of a process based on a processing command included in the program.

Advantageous Effects of Invention

According to the present invention, it is possible to provide an information processing system suitable for collectively managing a plurality of terminal devices.

BRIEF DESCRIPTION OF DRAWINGS

FIG. 1 illustrates a general view of an information processing system according to the present invention.

FIG. 2 illustrates an example of a terminal device (a wearable device).

FIG. 3 is a block diagram illustrating an example of hardware elements in each of a terminal device, a client device, and a cloud included in the information processing system.

FIG. 4 is a block diagram illustrating an example of main software elements included in the information processing system.

FIG. 5 illustrates an example of a flow of data or commands in a case where a web conference is held between terminal devices.

FIG. 6 is a block diagram illustrating another example of the main software elements included in the information processing system.

FIG. 7 is a flowchart illustrating an example of a case where a pixelation process is performed on video data obtained by a terminal device.

DESCRIPTION OF EMBODIMENTS

An embodiment for practicing the present invention will be described below with reference to the drawings. The present invention is not limited to the embodiment described below but includes modifications that are made by those skilled in the art as appropriate within a scope obvious to those skilled in the art from the following embodiment.

FIG. 1 schematically illustrates a general configuration of an information processing system 100 according to an embodiment of the present invention. The information processing system 100 according to the present embodiment is suitably used mainly in a use in which a supporter remotely supports, via the Internet, work performed on-site by a plurality of workers.

As illustrated in FIG. 1, the information processing system 100 includes a plurality of terminal devices 10, a client device 20, and a cloud 30. The terminal devices 10 are, for example, wearable devices. Examples of the wearable devices include neck-worn, glasses-type, head-worn, and watch-type wearable devices, and in the present embodiment, neck-worn wearable devices are adopted. Such terminal devices 10 will be worn by a plurality of workers, with one terminal device 10 per worker. As the client device 20, a general-purpose personal computer (PC) can be used. The client device 20 is operated basically by a supporter who supports the workers wearing the plurality of terminal devices 10. The cloud 30 includes a plurality of server devices that are mutually connected via the Internet. The cloud 30 is connected to the plurality of terminal devices 10 and the client device 20 via the Internet and also has a function as a relay device that sends control commands and data from the client device 20 to the terminal devices 10 and conversely sends data obtained from the terminal devices 10 to the client device 20.

FIG. 2 is an external perspective view illustrating an example of a terminal device 10. FIG. 3 also illustrates an example of hardware elements of a terminal device 10. As illustrated in FIG. 2, the terminal device 10 in the present embodiment is a neck-worn wearable device. The terminal device 10 includes a left arm portion, a right arm portion, and a body portion that connects the left arm portion and the right arm portion at a back of a neck of a wearer. When the terminal device 10 is worn, it will suffice that the entire device is suspended on a neck such that the body portion is in contact with the back of the neck of the wearer, with the left arm portion and the right arm portion hanging down from sides of the neck of the wearer toward a chest. In a housing of the terminal device 10, various electronic components are housed.

The left arm portion and the right arm portion are each provided with a plurality of sound collection units 14 (microphones). The sound collection units 14 are disposed mainly for obtaining sound around the wearer and voice of the wearer and an interlocutor. To cover a wide area to collect sound produced around the wearer, omnidirectional microphones are preferably adopted as the sound collection units 14. As the sound collection units 14, known microphones such as dynamic microphones, capacitor microphones, micro-electrical-mechanical systems (MEMS) microphones can be adopted. Each sound collection unit 14 converts sound into an electric signal, amplifies the electric signal with an amplifier circuit, then converts the amplified electric signal into digital information with an A/D converter circuit, and outputs the digital information to a control unit 11. A sound signal obtained by the sound collection unit 14 is transmitted to the control unit 11 provided in the housing and is subjected to a predetermined analyzing process.

The left arm portion is further provided with an image capture unit 16. Specifically, the image capture unit 16 is provided on a tip end surface of the left arm portion, and this image capture unit 16 can capture a still image or a video of a scene in front of the wearer. The image obtained by the image capture unit 16 is transmitted to the control unit 11 in the housing and stored as image data. As the image capture unit 16, a common digital camera can be adopted. The image capture unit 16 includes, for example, a photoelectric lens, a mechanical shutter, a shutter driver, a photoelectric transducer such as a CCD image sensor unit, a digital signal processor (DSP) that reads amounts of electric charge from the photoelectric transducer and generates image data, and an IC memory. The image data obtained by the image capture unit 16 is supplied to the control unit 11, stored in a storage unit 12, and subjected to a predetermined image analyzing process or sent via a communication unit 13 to the cloud over the Internet.

The left arm portion is further provided with an operation unit 15. The operation unit 15 receives an input of an operation by the wearer. As the operation unit 15, a known switch circuit, a known touch panel, or the like can be adopted. The operation unit 15 receives, for example, an operation to give an instruction to start or stop a voice input, an operation to give an instruction to turn on or off the device, an operation to give an instruction to increase or decrease a sound volume of a speaker, and other operations necessary to exercise functions of the terminal device 10. Information input via the operation unit 15 is transmitted to the control unit 11.

The right arm portion is further provided a sensor unit 17 of a contactless type. The sensor unit 17 is disposed on a tip end surface of the right arm portion mainly for detecting movement of a hand or hands of the wearer in front of the terminal device 10. The sensor unit 17 is, for example, a proximity sensor or a gesture sensor. The proximity sensor detects that, for example, a finger or fingers of the wearer has approached or entered a predetermined range. As the proximity sensor, a known proximity sensor such as an optical, ultrasonic, magnetic, capacitive, or thermal proximity sensor can be adopted. The gesture sensor detects, for example, an action or a shape of a finger or fingers of the wearer. The gesture sensor is, for example, an optical sensor, and the gesture sensor detects an action or a shape of a target object by directing light from an infrared LED toward the target object and capturing changes in its reflected light with a light receiving device. Detection information from the sensor unit 17 is transmitted to the control unit 11 and used mainly in controlling the image capture unit 16. Specifically, the detection information from the sensor unit 17 is used mainly to control the image capture unit 16 such as activating the image capture unit 16 or causing the image capture unit 16 to start or stop image capturing. For example, the sensor unit 17 may be configured to control the image capture unit 16 upon detecting that an object such as a hand of the wearer has approached the sensor unit 17 or may be configured to control the image capture unit 16 upon detecting that the wearer performs a predetermined gesture within a detection range of the sensor unit 17. Note that positions of the image capture unit 16 and the sensor unit 17 can be switched in the present embodiment.

The body portion, which is located on the back of the neck of the wearer, is provided with a sound emission unit (speaker) 18 on an outer side of the body portion (on an opposite side to the wearer). In the present embodiment, the sound emission unit 18 is disposed in such a manner as to output sound outward of the body portion. Emitting sound backward from the back of the neck of the wearer in this manner makes it difficult for the sound output from this sound emission unit 18 to directly reach an interlocutor present forward of the front of the wearer. This makes it easy for the interlocutor to distinguish between voice uttered by the wearer and sound emitted from the sound emission unit 18 of the terminal device 10. The sound emission unit 18 is an acoustic device that converts an electric signal into physical vibrations (i.e., sound). The sound emission unit 18 is, for example, a common speaker that transmits sound to the wearer through aerial vibrations. The sound emission unit 18 may be a bone conduction speaker that transmits sound to the wearer by vibrating a bone of the wearer. In this case, the sound emission unit 18 only has to be provided on an inner side (on the wearer side) of the body portion and configured such that the bone conduction speaker comes into contact with a bone of the back of the neck of the wearer (a cervical vertebra).

The left arm portion and the right arm portion are each further provided with a light projection unit 19. Each light projection unit 19 is configured to direct light within a capturing range of the image capture unit 16. The light projection unit 19 is, for example, a known laser light source or a known projector. For example, the light projection unit 19 can indicate a specific spot in front of the wearer with laser light emitted from a laser light source. The light projection unit 19 can draw a character or a figure with laser light emitted from the laser light source by performing scanning (e.g., Lissajous scanning) with this laser light. Alternatively, a known microprojector may be adopted as the light projection unit 19 to project image light forward of the wearer. Each light projection unit 19 is configured to independently change a direction of the directed light with a drive unit (actuator) provided inside the housing.

The control unit 11 of the terminal device 10 performs a computing process to control other elements included in the terminal device 10. As the control unit 11, a processor such as a CPU can be used. Basically, the control unit 80 reads programs (including an OS) stored in the storage unit 21, develops the programs onto a main memory, and executes a predetermined computing process according to these programs. The control unit 80 can also write and read a result of computation according to the programs to and from the storage unit 12 as appropriate. In addition, the control unit 11 of the terminal device 10 can control various hardware elements and perform predetermined computation by reading a predetermined function from the storage unit 21 and executing the function according to a command from an application program executed by the client device 20 or the cloud 30, which will be described later in detail.

The storage unit 12 of the terminal device 10 is an element for storing information to be used in the computing process and the like by the control unit 11 and storing a result of the computation. A storage function of the storage unit 12 can be implemented by, for example, a nonvolatile memory such as an HDD or an SSD. The storage unit 12 may have a function as a main memory for writing or reading an interim result and the like of the computing process by the control unit 11. A memory function of the storage unit 11 can be implemented by a volatile memory such as a RAM or a DRAM. The storage unit 11 may store ID information that is unique to a user who possesses the terminal device 10. The storage unit 11 may store an IP address that is identification information on the terminal device 10 on the network.

The communication unit 13 of the terminal device 10 is an element for performing wireless communication with the server device on the cloud or another terminal device 10. For the communication unit 13, a communication module for performing the wireless communication according to, for example, a known mobile communication standard such as 3G (W-CDMA), 4G (LTE/LTE-Advanced), or 5G, or a wireless LAN system such as Wi-Fi (registered trademark) can be adopted to perform communication with the server device or another neck-worn device via the Internet. Alternatively, for the communication unit 13, a communication module for short-range wireless communication of a system such as Bluetooth (registered trademark) or NFC can be also adopted to directly communicate with another terminal device 10.

Furthermore, in addition to the configuration illustrated in FIG. 3, the terminal device 10 can be equipped as appropriate with pieces of modular equipment that are installed on a common mobile information terminal, for example, sensors such as a gyro sensor, an acceleration sensor, a geomagnetic sensor, a proximity sensor, and a GPS sensor.

As is clear from FIG. 2 and FIG. 3, in the present embodiment, the terminal device 10 includes no display device such as a display or a monitor. Therefore, although a worker can perform a relatively easy operation such as turning on or off each hardware element, it is difficult for the worker to perform a complex operation such as operating an application program. Therefore, it is particularly effective to remotely operate such a terminal device 10 including no display device with the client device 20.

FIG. 3 further illustrates hardware elements of the client device 20. As the client device 20, a known personal computer (PC) can be used. Specifically, the client device 20 includes a control unit 21 including a processor such as a CPU, a storage unit 22 including a nonvolatile memory and a volatile memory, and a communication unit 23 including a communication module for Internet connection. The client device 20 further includes an input device 24 such as a mouse and a keyboard and a display device 25 such as a display. The client device 20 is a terminal that is operated by a supporter (an operator, etc.) who provides support information to workers on-site. This enables the supporter to send a work instruction and the like to workers on-site from a remote location.

FIG. 3 further illustrates hardware elements of the cloud 30. As the cloud 30 in the present embodiment, a known cloud computing system including one or a plurality of server devices 31 can be used. In the information processing system 100 according to the present invention, this cloud 30 is used basically for retaining various types of application programs, executing a process with a particularly heavy load, or retaining highly confidential information. This can dispense with time and trouble of installing various applications on each terminal device 10 beforehand, disperse processing loads in the terminal devices 10, and maintain security of the highly confidential information.

In addition, the cloud 30 includes a database 32. Note that this database 32 may be built by separately providing a server device for saving information or may be virtually built by aggregating storage capacities of the server devices. In the present embodiment, this database 32 stores authentication information that is necessary to execute application programs to be used in this system. For example, in a case where execution of an application needs account authentication, the database 32 only has to store in advance a unique account name and a password for the account name. In addition, in this database 32, various types of data necessary for using an application can be registered in advance. This database 32 may be configured such that information on wearers of terminal devices 10 (workers) and information on an operator of the client device 20 (a supporter) are registered in the database 32.

FIG. 4 illustrates main software elements included in the information processing system 100 according to the present invention. With reference to FIG. 4, basics of an architecture of the information processing system 100 will be described. This architecture is implemented by the various types of hardware illustrated in FIG. 2 and FIG. 3, particularly the control unit 11, the storage unit 12, and the communication unit 13 of each terminal device 10, the server device 31 and the database 32 of the cloud 30, and the control unit 21, the storage unit 22, and the communication unit 23 of the client device 20.

Basically, in the information processing system 100 according to the present invention, an SDK or the like including a variety of functions is introduced in advance into each terminal device 10, and the terminal device 10 reads a specific function according to an application program executed by the client device 20 or the cloud 30. This enables each terminal device 10 to substantially perform a process according to the application program without installing the application program in advance on the terminal device 10. Note that the "SDK" stands for a software development kit, which is an information group as a package of a variety of functions to be used when a program is executed. As the SDK, an SDL provided for a developer of an application program, such as Android SDK, iOS SDK, or Microsoft Windows SDK, can be used as appropriate.

To be specific, as illustrated in FIG. 4, the plurality of terminal devices 10 are each provided with first middleware 111 and an SDK 112. In addition, each terminal device 10 may be provided with a foreground and/or background service 113. The cloud 30 is provided with second middleware 112 that cooperates with the first middleware 111 of each terminal device 10. The client device 20 and/or the cloud 30 are respectively provided with application programs 121 and/or 131 that are designed to use functions of the SDK 112 installed on the terminal devices 10. That is, codes of these application programs 121 and 131 include processing commands for calling functions included in the SDK 112. When one of the application programs is executed in the client device 20 or the cloud 30, the processing commands are sent from the second middleware 132 of the cloud 30 to the first middleware 111 of a terminal device 10 in real time and at high speed. The control unit 11 of the terminal device 10 reads and executes specific functions from the SDK 112 in accordance with the processing commands received by the first middleware 111, thus causing the hardware elements 14 to 19 to function and performing the predetermined computing process (image processing, speech processing, etc.). The control unit 11 of the terminal device 10 can broadcast a processing command (message) received by the first middleware 111 in the terminal to call an appropriate service. This enables a function provided by the SDK 112 in the terminal device 10 to be remotely operated over a communication network such as a public network or a closed network.

As the first middleware 111 and the second middleware 132, for example, a messaging system for exchanging information among a plurality of application programs or services can be used. The second middleware 132 provided in the cloud 30 is, for example, a message broker, and the first middleware 111 provided in each terminal device 10 is, for example, a subscriber. In this case, the application programs 121 or 131 in the client device 20 or the cloud 30 can be regarded as a publisher that is an issuer of a message. That is, an issuer of a message is called a publisher, a receiver of the message is called a subscriber, and a function that relays the message between them is called a message broker. A message issued by the publisher is distributed to the subscriber via the message broker. The subscriber (the first middleware 111) can register information called subscription to specify a message to be received, rather than receiving all messages distributed from the message broker (the second middleware 132). That is, between the first middleware 111 and the second middleware 132, it is possible not only for the publisher to specify which subscriber (first middleware 111) to send a message to, but also for the subscriber (first middleware 111) to specify which message to receive. Such a messaging system is also referred to as a system of a Pub/Sub type.

The client device 20, an issuer of a message, can call and execute the application program 131 of the cloud 30 by using codes conforming to, for example, a rule (API) called REST. REST (REpresentational State Transfer) is one of design principles suitable for cooperation among a plurality of application programs in a distributed system and normally refers to such APIs that send a message written in XML, JSON, or the like when a specific URL is accessed according to HTTP with a specified parameter. Using the REST APIs as a communication rule between the client device 20 and the cloud 30 in this manner eliminates limitations on a language for implementing the application programs. In addition, a combination of REST APIs can implement a certain level of process, and thus the application programs can be developed by low-coding. As a result, it is expected that the number of developers of an application program for controlling the terminal device 10 will be increased.

Between the first middleware 111 and the second middleware 132 illustrated in FIG. 4, there are roughly three communication routes. The first communication route is a communication route for commands. The commands can be sent from the second middleware 132 to the first middleware 111 asynchronously in a push/pull manner with the messaging system of the Pub/Sub type mentioned above. A result of processing according to an asynchronous command may be notified via another route such as a webhook. Furthermore, simple authentication information, such as an account name and a password, can be sent to the first middleware 111 via this communication route for command. The second communication route is a communication route for discrete time-series data. The discrete time-series data mentioned here is time-series data with a relatively low throughput, such as GPS latitude-longitude information, battery level information, a wearing/not wearing state, and posture information resulting from interpreting a measurement result from the acceleration sensor. These types of discrete time-series data may be communicated via the same messaging system or by using a route such as a webhook. That is, the second communication route is substantially the same as the first communication route. The third communication route is a communication route for continuous time-series data. A typical example of the continuous time-series data is voice data or video data. In addition, examples of the continuous time-series data include time-series data with a relatively high throughput, such as data measured at high frequency. Such continuous time-series data exceeds a communication capacity commensurate with a message queuing system, and thus another communication route needs to be prepared. The third communication route is, for example, a communication route such as WebRTC, Http Live Streaming (HLS), or Amazon Kinesis Video Stream, and an appropriate communication route can be selected in accordance with content of communication.

From an overview of this architecture, it is possible to understand that the architecture expands a concept of an operating system (OS). That is, from its original meaning, it can be understood that the OS means "software serving as a foundation for enabling a computer system to act." A boundary of software that serves as a foundation for actions of the individual terminal devices 10 and cooperative actions among a group of the plurality of terminals can be considered to be present at a dash-dotted line drawn in FIG. 4, that is, between the client device 20 and the cloud 30. Therefore, the expanded concept of the OS contains the terminal devices 10 and the cloud 30 on the Internet. This brings a meaning when consideration is additionally given to a fact that an OS is taken as a given for a developer (a user) and is not a development object (but an operation object). That is, it is conventionally necessary to begin with building a cloud computing service and developing an Internet communication program. In contrast, providing these to a developer as functions provided by an OS will allow the developer to develop only an application program without being conscious of presence of the Internet and the cloud computing service.

Subsequently, a practical example of the architecture of the information processing system 100 according to the present invention will be described.

FIG. 5 illustrates an example of a case where a process according to an application program that needs authentication of an account is performed in a terminal device 10. A specific example of the application program is an application program for a web conference. In an embodiment illustrated in FIG. 5, this application program 131 for a web conference is installed on the cloud 30. The application program 131 for a web conference is assumed to be, for example, Zoom (registered trademark), Microsoft Teams (registered trademark), or the like.

In the embodiment illustrated in FIG. 5, the client device 20 instructs the cloud 30 to execute the application program 131 for a web conference. The client device 20 includes the application program 121 for this purpose. The application program 121 of the client device 20 may be a program dedicated to instructing the cloud 30 to execute the application program 131, or a general-purpose program such as a web browser may be used as the application program 121. The client device 20 can give a predetermined instruction to the cloud 30 via one of these application programs 121. The instruction to execute the application program 131 given to the cloud 30 includes information to specify a terminal device 10 to serve as a participant of the web conference from among the plurality of terminal devices 10. The instruction to execute the application program 131 given to the cloud 30 may further include information to specify a terminal device 10 (a) to assign a host account for the web conference and information to specify another terminal device 10 (b) that is to participate in the web conference using a guest account. In this manner, the client device 20 can instruct any terminal device 10 to start the web conference and can freely assign the host account and the guest account. In this case, the application program 121 of the client device 20 and the control unit 21 for controlling the application program 121 each function as a "process instruction unit" described in the scope of claims.

For example, the accounts for the web conference can be automatically assigned by the cloud 30. For example, the cloud 30 may be configured such that, when receiving the application program 131 for a web conference from the client device 20, the cloud 30 activates the application program 131, assigns the host account to a terminal device 10 (a) that has, for example, optimum network environment conditions and battery conditions at that time, and assigns the guest account to a terminal device 10 (b) other than the terminal device 10 (a), from among terminal devices 10 specified as participants in the web conference. For example, it is reasonable to select, as a host, a terminal device 10 that has a best network environment and has a highest battery level (or is connected to an external power source). In this manner, the cloud 30 can also automatically instruct each terminal device 10 to perform a process for a web conference. In this case, the application program 131 of the cloud 30 and the server device 31 for controlling the application program 131 each function as the "process instruction unit" described in the scope of claims.

Next, the cloud 30 executes the application program 131 for a web conference, causes a first terminal device 10 (a) to perform a process for the host account, and causes a second terminal device 10 (b) to perform a process for the guest account. Executing the process for the host account needs authentication information. Therefore, the cloud 30 provides the first terminal device 10 (a) with authentication information for the host account. This authentication information is authentication information for accessing an external server device of a business operator that provides a web conference service and for logging in to the external server device as the host account. Note that the external server device here can be regarded as a server device included in the cloud 30. In the application program 131 for a web conference, the authentication information necessary to execute the process for the host account is stored in the database 32. The authentication information is, for example, a combination of an account name and a password, or a private key. Therefore, in the present embodiment, the database 32 of the cloud 30 functions as an "authentication information storage unit" described in the scope of claims. Note that this authentication information is not necessarily saved in the cloud 30 in advance and may be saved in the client device 20. In this case, this authentication information has to be provided from the client device 20 to the first terminal device 10 (a) via the cloud 30. In this case, the storage unit 22 of the client device 20 functions as the "authentication information storage unit" described in the scope of claims.

Next, the cloud 30 sends, to the terminal devices 10 (a) and 10 (b), a processing command generated as a result of executing the application program 131 for a web conference and necessary data for the processing command, via the second middleware 132 using the messaging system. At this time, to the first terminal device 10 (a), the cloud 30 additionally sends the authentication information necessary to perform the process for the host account. Note that the cloud 30 may issue, in place of the authentication information, a temporary token that can be used as an alternative to the authentication information and send the temporary token to the first terminal device 10 (a). Although the guest account usually does not need authentication information, in a case where authentication information for the guest account is necessary, the cloud 30 also sends, to the second terminal device 10 (b), the authentication information for the guest account or sends a temporary token that is an alternative to the authentication information. Therefore, the application program 131 of the cloud 30 and the server device 31 for controlling the application program 131 function as an "authentication information providing unit" described in the scope of claims.

The first terminal device 10 (a) receives a processing command (a function calling command), necessary data, and the authentication information from the cloud 30 via the first middleware 111. Likewise, the first terminal device 10 (b) receives a processing command (a function calling command) and necessary data from the cloud 30 via the first middleware 111. According to the processing command from the cloud 30, the first terminal device 10 (a) reads a specific function from the SDK 112 and executes the specific function. When predetermined data and authentication information are needed at that time, the first terminal device 10 (a) uses them for executing the function. Alternatively, the first terminal device 10 (a) broadcasts the processing command from the cloud 30 in the terminal to call an appropriate service 113. For example, the first terminal device 10 (a) activates the sound collection units 14 and the image capture unit 16 to obtain voice data and video data and sends the voice data and the video data to the second terminal device 10 (b) and the like via the Internet. Likewise, the first terminal device 10 (a) also receives voice data and video data from the second terminal device 10 (b). The first terminal device 10 (a) can also access the external server device of the business operator that provides the web conference service to perform an authentication process on the host account.

In a case where the first terminal device 10 (a) gets into such a situation that the first terminal device 10 (a) is no longer suitable for hosting the web conference, it is possible to move the authentication information for the host account from the first terminal device 10 (b) to the second terminal device 10 (b). For example, in a case where a remaining battery level of the first terminal device 10 (a) falls to or below a predetermined value or a case where a quality of network communication of the first terminal device 10 (*a*) deviates from a predetermined condition, the cloud 30 automatically moves the authentication information from the first terminal device 10 (*a*) to the second terminal device 10 (*b*). This enables the web conference to be continued stably.

Thus, it becomes possible to remotely operate various functions based on the SDK 112 in each terminal device 10 over the communication network according to the application program executed by the cloud 30. In particular, by the cloud 30 executing the application program to use functions of the SDK 112 in each terminal device 10 in combination as appropriate, it is possible to cause the terminal device 10 to perform substantially the same action as in a case where the application program is installed on the terminal device 10. In the example mentioned above, the application program for a web conference is shown, but the present invention is not limited to this and can be applied to various programs.

Subsequently, another practical example of the architecture of the information processing system 100 according to the present invention will be described. In this example, a place to perform a process according to an application program can be specified freely to some extent.

An embodiment illustrated in FIG. 6 has an architecture that is basically the same as that illustrated in FIG. 4, but the cloud 30 also includes an SDK 133 and a service 134 as with the SDK 112 and the service 113 of the terminal device 10. In addition, likewise, an SDK 122 and a service 123 may be built in the client device 20.

Using a terminal device 10 to provide a remote support service or a working video recording service in the system configuration illustrated in FIG. 6 will be discussed. In the former case, a video captured by the terminal device 10 is used as a video call with the client device 20 in a remote support center and is simultaneously saved in the server device on the cloud 30 as video data. In the latter case, video data is once accumulated in the terminal device 10 and then transferred to and saved in the server device on the cloud 30 in a batch manner as video data. In such services, a privacy problem arises in using and saving the video data. Therefore, it is necessary to perform a pixelation process on a predetermined area in the video. The pixelation process is performed typically on a face of a person seen in the video or a background of the video, other than a capturing target object.

FIG. 7 briefly illustrates a flowchart of a process by an application program that automatically performs the pixelation process on a face area in a video. Specifically, this application program includes a step of obtaining video data with a terminal device 10 (step S1), a step of detecting a face area of a person from the video data (step S2), a step of determining whether the face area is detected (step S3), a step of, when the face area is detected, performing the pixelation process on the area (step S4), and a step of obtaining final video data (step S5). For example, the flowchart is represented in a functional programming manner at the bottom of FIG. 7.

In this program, "MOVIE_DATA" means the video data obtained with the terminal device 10. Additionally, "GET_MOVIE" means a process of activating a camera of the terminal device 10 and obtaining the video data (step S1), "DETECT_FACE" means a face detecting process (step S2), and "CREATE_MOSAIC" means a face-area pixelation process (step S4). Additionally, "i" is an ID of the terminal device 10, and "j" indicates a place to execute each process.

In the system illustrated in FIG. 6, "GET_MOVIE" is the process that can be executed only by the terminal device 10, and thus "i" is assigned as a place to execute the process. In contrast, places to perform the other processes of "DETECT_FACE" and "CREATE_MOSAIC" each can be specified freely. Specifically, the places for these processes each can be selected from the terminal device 10, the client terminal 20, and the cloud 30. Alternatively, it is possible to separately specify a server device 31 to execute each process from among a large number of server devices 31 included in the cloud 30. For example, what is called a fog server, such as a server device installed at a site of work (in a factory site, etc.) of a worker who wears a terminal device 10 or a server device installed on a multi-access edge computing (MEC) area in a communication network of a local 5G, may be specified as the place to execute each process.

At which places the face detecting process (step S2) and the face-area pixelation process (step S4) are to be executed is essentially optional. For example, items of original video data are uploaded from the terminal devices 10 to the cloud 30, and then intensively subjected to the face detecting process and the face-area pixelation process by the server device 31 on the cloud 30, so that it is possible to reduce processing loads on the terminal devices 10 and to increase efficiencies of these processes. However, in a case where privacy protection is considered to be a top priority, such a scheme that a terminal device 10 performs the face detecting process and the face-area pixelation process to complete video data so that the video data going out of the terminal device 10 has already been subjected to the face-area pixelation process can be considered to be a most appropriate from a viewpoint of privacy protection. In this manner, it is possible to freely determine which process is to be executed in which place, in accordance with a situation and characteristics of data to be treated.

An SDK that includes a variety of functions including the functions "GET_MOVIE," "DETECT_FACE," and "CREATE_MOSAIC" described above are prepared beforehand in not only the terminal devices 10 but also the cloud 30 (or the server devices 31 included in the cloud 30) and the client device 20. For example, the client device 20 issues the program as illustrated in FIG. 7 and sends the program to the cloud 30, and a message is distributed collectively from the second middleware 132 of the cloud 30 to the terminal devices 10. When each terminal device 10 receives the message with the first middleware 111, the terminal device 10 reads functions specified in the program from the SDK 112 and executes the functions. Likewise, the cloud 30 and the client device 20 themselves will also read functions specified in the program from the SDKs 133 and 122 and execute the functions, respectively. Thus, it becomes possible to easily specify a place to execute the program, in accordance with details of a process.

The description is given here with an example in which the pixelation process is performed on a face area in video data. However, this is merely an example, and the architecture of the system according to the present invention can specify a place to execute a program, freely to some extent in accordance with details of a process, for various application programs.

For the pixelation process described in this example, a privilege for a place where the pixelation process can be executed may be set. For example, a device that can perform the pixelation process on, for example, a captured image, may be limited beforehand, and only a device that has been given the privilege (a permission) of executing the pixelation process among the terminal devices 10, the client device 20, and the cloud 30 may be configured to be capable of executing this pixelation process. This privilege for the place where the pixelation process can be executed can be saved in advance as authentication information in the database 32 on the cloud 30. For example, in a case where the privilege of the execution is set to the pixelation process, when the process needs to be performed in a terminal device 10, the cloud 30 provides the terminal device 10 with the authentication information saved in the database 32. This enables the terminal device 10 to execute the pixelation process based on the authentication information.

Herein, an embodiment according to the present invention has been described above with reference to the accompanying drawings to express details of the present invention. The present invention is however not limited to the embodiment described above but includes modifications and improvements obvious to those skilled in the art based on the disclosure provided herein.

REFERENCE SIGNS LIST

| | |
|---|---|
| 10 terminal device | 11 control unit |
| 12 storage unit | 13 communication unit |
| 14 sound collection unit | 15 operation unit |
| 16 image capture unit | 17 sensor unit |
| 18 sound emission unit | 19 light projection unit |
| 20 client device | 21 control unit |
| 22 storage unit | 23 communication unit |
| 24 input unit | 25 display unit |
| 30 cloud | 31 server device |
| 32 database | 100 information processing system |
| 111 first middleware | 112 SDK |
| 113 service | 121 application program |
| 122 SDK | 123 service |
| 131 application program | 132 second middleware |
| 133 SDK | 134 service |

The invention claimed is:

1. An information processing system comprising:
a terminal device, a client device, and a cloud that includes one or a plurality of server devices connected to the terminal device and the client device through a network, wherein
the cloud includes:
a predetermined program including a plurality of processing commands; and
second middleware that sends a processing command generated as a result of executing the program, to the terminal device,
the client device includes a processor that instructs the cloud to execute the program after specifying the terminal device,
the terminal device includes:
an information group including a plurality of functions that are used when the program is executed; and
first middleware that receives the processing command sent from the second middleware,
the client device or the cloud includes:
a process instruction unit that selects, for each of the processing commands included in the program, a device that is to perform a process based on the processing command, from among the terminal device, the server devices, and the client device, and
the terminal device, the server devices, or the client device selected by the process instruction unit executes the process based on the processing command for which the process instruction unit has given an instruction.

2. The information processing system according to claim 1, wherein the terminal device is a terminal device including no display unit.

3. The information processing system according to claim 1, wherein the process instruction unit causes the plurality of server devices or the client device to perform at least part of a process based on a processing command included in the program.

4. The information processing system according to claim 1, wherein
the process instruction unit further specifies a specific terminal device from among the plurality of terminal devices and instructs the specific terminal device to execute a process according to the program,
the client device or the cloud further includes:
an authentication information storage unit that retains authentication information necessary to execute the program; and
an authentication information providing unit that provides the specific terminal device specified by the process instruction unit with authentication information or temporary information that is an alternative to the authentication information, the authentication information being authentication information necessary to perform a process according to a program for which the process instruction unit has given an instruction or being authentication information for checking whether the process has been permitted to be performed, and
the specific terminal device performs a process based on an instruction from the process instruction unit, using the authentication information or the temporary information provided from the authentication information providing unit.

5. The information processing system according to claim 4, wherein
the client device or the cloud further includes a program execution unit that executes the program,
the process instruction unit instructs the specific terminal device to execute a process according to the program executed by the program execution unit, and
the specific terminal device performs a process based on an instruction from the process instruction unit.

6. The information processing system according to claim 4, wherein
the program is an application program for a web conference,
the authentication information includes authentication information for a host account and authentication information for a guest account of a web conference, and
the process instruction unit specifies, from among the plurality of terminal devices, one terminal device to assign the host account of the web conference and another terminal device to assign the guest account for participating in the web conference hosted by the one terminal device.

7. The information processing system according to claim 6, wherein the host account of the one terminal device and the guest account of the other terminal device are interchangeable with each other.

8. The information processing system according to claim 6, wherein the process instruction unit specifies the one terminal device to assign the host account, based on battery levels or communication qualities of the terminal devices.

* * * * *